United States Patent Office 3,096,303
Patented July 2, 1963

3,096,303
NOVEL ORGANOPOLYSILOXANE COMPOSITIONS
Joseph C. Caprino, Cohoes, N.Y., and Robert J. Prochaska, Pittsfield, Mass., assignors to General Electric Company, a corporation of New York
No Drawing. Filed May 25, 1954, Ser. No. 432,332
19 Claims. (Cl. 260—46.5)

This invention is concerned with new polymerizable organopolysiloxane compositions, products derived therefrom and methods for preparing the same. More particularly, the invention relates to compositions of matter corresponding to the general formula (I) 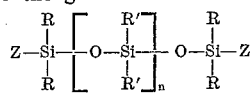

where Z is an unsaturated radical selected from the class consisting of the vinyl, allyl and methallyl radicals, R is a member selected from the class consisting of methyl, ethyl, phenyl and chlorinated phenyl radicals, R' is a monovalent hydrocarbon radical, and $n$ represents a positive integer, preferably greater than 1, e.g., from 50 to 9000 or more.

In the present manufacture of organopolysiloxanes which are convertible to the cured, solid, elastic state (known as "silicone rubbers"), the usual procedure is to polymerize a low molecular weight product to a high molecular weight, extremely viscous and substantially nonflowable gum which is thereafter compounded with various fillers and curing agents, and then subjected to elevated temperatures to effect conversion of the filled organopolysiloxane to the cured, solid, elastic state. Because of their high viscosity, the polymers thus obtained are difficult to manipulate mechanically, especially with certain desirable reinforcing fillers. Because of this difficulty (which is believed to be due to insufficient wetting), one cannot incorporate satisfactorily larger amounts of these fillers which would be desirable in many instances. Moreover, these high molecular weight polymers are difficult to control in their manufacture, and are quite sensitive to changes in humidity. In addition, they are not to amenable to continuous preparation by a continuous polymerization process because of the difficulty of washing and processing these polymers which are of too high a molecular weight. Also because of the high molecular weight and viscosity of these polymers, it is necessary to employ expensive and extensive milling operations.

We have now discovered that we are able to make organopolysiloxanes (useful for making cured, solid, elastic products) which are more readily obtained in low molecular weight liquid forms of much lower viscosity than has heretofore been obtained. These polymers are useful in the preparation of cured, solid, elastic products and obviate the difficulties recited above in connection with the organopolysiloxanes heretofore employed for making these cured materials. Because of the low molecular weight and low viscosity of the organopolysiloxane chain compounds coming within the scope of our invention, they can readily be processed in various mechanical operations, and one can employ a much wider variety of fillers than has heretofore been possible, while at the same time permitting the incorporation (because of increased wettability) of larger amounts of certain fillers (such as finely divided silicas) of the reinforcing type than has heretofore been believed possible with the organopolysiloxanes known prior to our invention. Moreover, because of the shorter chain length of our fluid polymers, it is possible to effect a more rigid control in their preparation; it is also found that these polymers are much less sensitive to humidity changes. Because of their low molecular weight and viscosity, they can be readily washed and processed, making this an extremely desirable feature which is helpful in continuous polymerization of the low molecular weight polymers. Finally, the necessity for expensive milling times and equipment can generally be obviated since only mere mechanical mixing, i.e., agitation, of the filler and the polymers of our invention is necessary to effect intimate dispersion of the filler in the polymer.

Unexpectedly, we have also found that these low molecular weight, low viscosity organopolysiloxanes, when mixed with a filler and thereafter converted to the cured, solid, elastic state, exhibit lower compression set (that is, permanent set at elevated temperatures) than has heretofore been obtained with filled, cured, silicone rubbers free of compression set additives.

The starting materials used to prepare the above-mentioned cured, solid, elastic products comprise compositions having the general formula

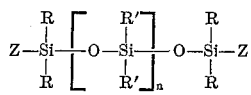

where Z, R and R', and $n$ have the meanings given above. Among the monovalent hydrocarbons which R' may represent are, for example, alkyl radicals, for instance, methy, ethyl, propyl, butyl, isopropyl, etc., radicals; aryl radicals, for instance, phenyl, naphthyl, etc., radicals; alkaryl radicals, for instance, tolyl, xylyl, etc., radicals; aralkyl radicals, for instance, benzyl, phenylethyl, etc., radicals; mixed alkyl and aryl radicals, for instance, methyl and phenyl radicals attached to the same silicon atom, etc.; and halogenated aryl radicals, for instance, chlorinated phenyl radicals. The presence of small amounts of unsaturated radicals such as vinyl, allyl, etc., radicals as other values for R' is not precluded.

The compositions herein defined may be obtained by several means. One method comprises effecting reaction, in a medium in which olefinic polymerizable compositions will not polymerize, between a disiloxane (hereinafter referred to as "alkenyl disiloxane") of the formula (II) 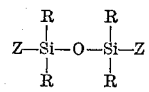

and a polysiloxane consisting essentially of the units (III) 

for example, compounds of the formula $[R'_2SiO]_m$ where Z, R and R' have the meanings given above and $m$ is an integer equal to from 3 to 10 or more. The alkenyl disiloxane may be obtained by condensing a compound corresponding to the general formula (IV) 

where Z and R have the meanings given above. Among such compositions may be mentioned, for instance, 1,1,3,3-tetraphenyl-1,3-divinyldisiloxane, 1,1,3,3-tetramethyl-1,3-divinyldisiloxane, 1,1,3,3 - tetraphenyl - 1,3 - diallyldisiloxane, 1,1,3,3-tetramethyl-1,3-diallyldisiloxane, 1,1,3,3,-tetraethyl - 1,3 - divinyldisiloxane, 1,1,3,3 - tetraphenyl-1,3-dimethallyldisiloxane, etc.

A still further method for making the alkenyl chain-stopped polysiloxanes of the instant invention, more particularly illustrated by the formula

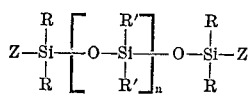

comprises effecting reaction between a polysiloxane consisting essentially of the units

and an alkenyl organosilanol of the formula

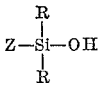

where Z, R and R', and $n$ have the meanings recited previously. We prefer to employ the alkenyl disiloxane for reaction with the above-described polysiloxane of

because the conditons of reaction are usually less critical and for the further reason that fewer precautions are required in handling the alkenyl disiloxane than the alkenyl organosilanol. However, it will be apparent that under some conditions it may be advantageous to use the alkenyl organosilanol.

Among the organopolysiloxanes having the formula consisting essentially of the recurring structural unit

which may be employed in the practice of the present invention may be mentioned, for instance, low molecular weight organopolysiloxanes, e.g., hexamethylcyclotrisiloxane, octamethylcyclotetrasiloxane, pentamethylcyclodecasiloxane, tetramethyltetraphenylcyclotetrasiloxane having the formula

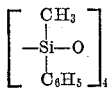

octaethylcyclotetrasiloxane, etc. Mixtures of these cyclic organopolysiloxanes as, for instance, a mixture of octamethylcyclotetrasiloxane and hexaphenylcyclotrisiloxane, etc. are intended to be included within the scope of the invention for reaction with the alkenyl disiloxane or alkenyl organosilanol.

It will also be apparent that instead of the low molecular weight organopolysiloxanes, one may also employ higher molecular weight products in the practice of our invention, for instance, high molecular weight products obtained by condensing octamethylcyclotetrasiloxane with alkaline agents, such as potassium hydroxide, etc., as is more particularly described in U.S. Patents 2,541,137 and 2,671,069.

The reaction between the alkenyl disiloxane and the organopolysiloxane comprising essentially the recurring

unit (hereinafter referred to as "coreactive polysiloxane" which may also be a linear organopolysiloxane containing terminal silicon bonds, hydroxy, alkoxy, acyloxy groups, —OM— groups, where M is an alkali metal, etc.) is advantageously carried out in an environment which will not cause polymerization of the alkenyl radicals. This initial interpolymerization between the alkenyl disiloxane and the coreactive polysiloxane is advantageously effected in the presence of alkaline materials such as alkali-metal hydroxides, for example, potassium hydroxide, cesium hydroxide, etc.; certain ammonium and phosphonium compounds, such as, for instance, tetramethyl ammonium hydroxide, tetra-n-butylphosphonium hydroxide, etc.; which are notorious for inhibiting polymerization of olefinic unsaturated groups.

The amount of polymerizing agent capable of effecting interpolymerization between the alkenyl disiloxane and the coreactive polysiloxane may be varied widely, but is advantageously present in an amount equal to from about 0.001 to 0.2%, by weight, based on the weight of the alkenyl disiloxane and the coreactive organopolysiloxane, depending upon such factors as the polymerizing agent used, the alkenyl disiloxane (or alkenyl organosilanol) and coreactive organopolysiloxane present in the reaction mixture, the temperature at which heating is carried out, the time of heating, etc. In general, this initial interpolymerization readily takes place at temperatures ranging from about 125° to 175° C. More reactive interpolymerization agents such as cesium hydroxide permit lower temperatures of reaction, for instance, as low as 80° to 110° C. The time of reaction will vary as will be apparent to those skilled in the art, but is advantageously within the range of from about ¼ hour to about 6 or more hours depending on the reactants, interpolymerization agent used, as well as the temperature at which reaction is carried out.

One of the advantages of preparing the compositions herein described and claimed resides in the fact that fairly rigid control can be maintained of the molecular weight of the final interpolymerized product. This is accomplished by varying the concentration of the alkenyl disiloxane, or alkenyl organosilanol (in view of the interchangeability of the latter two terms hereinafter "alkenyl disiloxane" will be used to refer to both, unless otherwise stated). As the proportion of alkenyl disiloxane increases relative to the amount of the coreactive organopolysiloxane, the viscosity of the interpolymerized product will decrease. Thus, taking as an example of the coreactive organopolysiloxane, octamethylcyclotetrasiloxane, and as an example of the alkenyl disiloxane, 1,1,3,3-tetraphenyl-1,3-divinyldisiloxane, one finds that when employing 296 grams (1 mol) of the former with amounts of the alkenyl disiloxane ranging from 0.2 gram to 2.4 grams, the viscosity will vary from 7,950 to over 2,000,000 centipoises. It is thus clearly evident that by varying the concentration of the alkenyl disiloxane, polymerizable fluids of varying viscosity can be realized with a minimum of control and with a maximum of versatility of the interpolymerized products.

After preparation of the reaction product of the alkenyl disiloxane and the reactive organopolysiloxane, said reaction products hereafter being referred to as "convertible organopolysiloxane," the latter is advantageously combined with a filler and a curing agent and thereafter used for various applications, for instance, for molding, extruding, coating, etc., purposes, with the application of heat and pressure where required. Among such fillers may be mentioned, e.g., titanium dioxide, calcium carbonate, lithopone, zirconium silicate, iron oxide; various reinforcing fillers, particularly finely divided silica, such as silica aerogel, fumed silicas, etc., said silicas being sold under the names of Santocel (manufactured by Monsanto Chemical Company), Hi-Sil (manufactured by Columbia Southern Company), Cab-O-Sil (distributed by Godfrey L. Cabot Company), etc. The amount of filler employed in each instance will vary depending on such factors as the type of filler used, the application for which the cured products are intended, the molecular weight and viscosity of the convertible organopolysiloxane, etc. On a weight basis we may employ from about 0.2 to 2 or more parts of the filler per part of the convertible organopolysiloxane. The amount of reinforcing, finely divided silica fillers used with these convertible organopolysiloxanes, although it is less than can be employed in combination with many of the other non-reinforcing or semi-reinforcing fillers mentioned above, is still materially greater than has heretofore been possible to use with the higher molecular weight, high viscosity organopolysiloxanes convertible to the cured, solid, elastic state.

Among the curing agents which may be employed to cure the convertible organopolysiloxane may be mentioned benzoyl peroxide, tertiary butyl perbenzoate, boron hydrides, various azobutyronitriles, 2,4-dichlorobenzoyl peroxide, para-chlorobenzoyl peroxide; etc. The amount of curing agent may range from about 0.1 to as high as 8 to 10 percent, by weight, based on the weight of the convertible organopolysiloxane. We have found that the presence of the alkenyl groups requires smaller amounts of the curing agent than formerly necessary in alkenyl-free polysiloxanes for at least equivalent and in some respects improved properties, such as compression-set characteristics. If desired, conversion to the cured, solid, elastic state may be effected without any curing agent but instead employing high energy electrons as is more particularly disclosed and claimed in the copending application of Elliott J. Lawton and Frederick M. Lewis, Serial No. 291,542, filed June 3, 1952, and assigned to the same assignee as the present invention.

In order that those skilled in the art may better understand how the present invention may be practiced, the following examples are given by way of illustration and not by way of limitation. All parts are by weight.

EXAMPLE 1

The compound 1,1,3,3-tetraphenyl-1,3-divinylsiloxane was prepared as follows. Phenyl magnesium bromide was prepared in the usual fashion by adding freshly distilled bromobenzene (2 mols) dissolved in 300 cc. diethyl ether to magnesium turnings (2 mols) covered with 200 cc. diethyl ether. The Grignard reaction mixture was heated at reflux one-half hour after the addition was complete, the ether solution of phenyl magnesium bromide was decanted from the unreacted magnesium and added dropwise to a stirred solution of vinyltrichlorosilane (1 mol) in 200 cc. diethyl absolute ether. The reaction mixture was stirred for about 15 hours at room temperature (about 25° C.) to complete the reaction. The inorganic salts formed as a result of the reaction were removed by filtration, and the residual liquid was fractionally distilled under reduced pressure to obtain a colorless liquid boiling at 97–98° C. at 0.25 mm. This was identified as diphenyl-vinylchlorosilane as evidenced by the fact that it was found to contain 14.48% chlorine as compared to the theoretical value of 14.55% chlorine. About 83 grams of the above diphenylvinylchlorosilane were added dropwise with vigorous stirring to 250 cc. of water. An oily layer formed and the entire hydrolysis reaction mixture was cooled to about 0° C. to cause deposition of a mass of crystals which, when removed from the liquid in the mixture and recrystallized from 95% ethyl alcohol, yielded 43 grams of a white crystalline solid melting at 78.5–81° C. This material was identified as essentially pure 1,1,3,3-tetraphenyl-1,3-divinyldisiloxane as evidenced by the fact that it was found to contain 77.7% carbon, 6.31% hydrogen, and 13.8% silicon (theoretical: 77.4% carbon, 5.99% hydrogen, and 12.9% silicon).

EXAMPLE 2

Varying amounts of the tetraphenyldivinyldisiloxane prepared in Example 1 were mixed with octamethylcyclotetrasiloxane, and each mixture heated under nitrogen for four hours at about 150° C. in the presence of 0.04%, by weight, potassium hydroxide based on the weight of the octamethylcyclotetrasiloxane. As a result of the varying amounts of the tetraphenyldivinyldisiloxane, there were obtained fluids of varying viscosity. About 100 parts of one fluid having a viscosity of 55,500 centipoises (Sample No. 5) were compounded with 40 parts of finely divided silica aerogel together with 1.65 parts benzoyl peroxide. This polymer compound was press-cured for 15 minutes at approximately 150° C. at a pressure of about 750 p.s.i. and thereafter given a further heat treatment outside the mold for 1 hour at 150° C. and then for 24 hours at 250° C. in an air circulating oven. For comparison, there was also prepared an organopolysiloxane (of about 2,010,000 centipoises viscosity, Sample No. 9) convertible to the cured, solid, elastic state by heating octamethylcyclotetrasiloxane with a similar amount of potassium hydroxide as described above for about four hours at 150° C. As part of the latter reaction mixture, there was also incorporated in the 296 parts of octamethylcyclotetrasiloxane, 0.096 gram decamethyltetrasiloxane. The latter small amount of linear polysiloxane is used in making the above convertible organopolysiloxanes for the purpose of controlling the viscosity of the latter.

The following Table I shows the properties of the various mixtures of organopolysiloxanes prepared as described above having the general formula

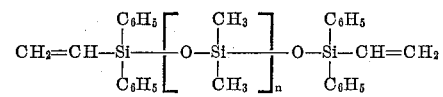

where $n$ is an integer greater than 1, e.g., from about 250 to 8700, and illustrates the manner whereby the practice of the present invention enables one to control the viscosity and thus the molecular weight of the former organopolysiloxanes by means of the amount of alkenyl disiloxane used.

Table I

| Sample No. | Gram weight octamethylcyclotetrasiloxane | Gram weight alkenyl disiloxane | Gram weight decamethyltetrasiloxane | Approximate average number of [(CH₃)₂SiO] units | Viscosity,[1] centipoises |
|---|---|---|---|---|---|
| 1 | 296 | 0.20 | | 8,700 | 2,210,000 |
| 2 | 296 | 0.40 | | 4,350 | 878,000 |
| 3 | 296 | 0.60 | | 2,900 | 275,000 |
| 4 | 296 | 0.80 | | 2,175 | 121,000 |
| 5 | 296 | 1.20 | | 1,450 | 55,000 |
| 6 | 296 | 2.40 | | 725 | 7,950 |
| 7 | 296 | 4.80 | | 362 | |
| 8 | 296 | 7.20 | | 242 | |
| 9 | 296 | | 0.096 | | 2,010,000 |

[1] Viscosities of the polymers were measured with a Brookfield viscosimeter approximately 7 days after polymerization had taken place.

The two above-described molded, filled organopolysiloxanes, based on the convertible organopolysiloxanes made from Samples 5 and 9 were tested for tensile strength, elongation, tear strength, compression set (after 70 hrs. at 149° C. under constant deformation using regular A.S.T.M. procedures) and weight loss when heated for 24 hours at 250° C. These tests showed that whereas the sample made with Sample No. 9 showed a weight loss of 9.3%, a tensile strength of 620 p.s.i., an elongation of 325%, a tear strength of 105 pounds per inch, and a compression set of 80.5%, the sample made with the tetraphenyldivinyldisiloxane (having a polymer viscosity of 55,500 centipoises) showed a weight loss after 24 hours at 250° C. of 8.6%, a tensile strength of 605 p.s.i., an elongation of 250%, a tear strength of 120 p.s.i., and a compression set of 54.7%. By using smaller concentrations of benzoyl peroxide (e.g., half as much) even lower compression set values may be obtained.

EXAMPLE 3

In this example, 100 parts of the polymer described in Table I of Example 2 (Sample No. 1) which had a viscosity of 2,210,000 centipoises were mixed with 40 parts silica aerogel on a mill to a sheet thickness of about 40 mils thick. The sheet was cut into strips of about 1″ x 4.5″ x 0.40″ and thereafter subjected to irradiation with high energy electrons with curing doses of $4 \times 10^6$ and $2 \times 10^6$ Roentgen units in the manner more particularly described in the above-mentioned patent application of Lawton and Bueche. As a result of this treatment with high energy electrons, it was found that with the first dose, this polymer had a tensile strength of 1,050 p.s.i. and an elongation of 400%, while with the 2×10⁶ r. dose, the cured polymer had a tensile strength of 840 p.s.i. and an elongation of 400%.

EXAMPLE 4

This example illustrates the ability to use the compositions described in the present application for potting purposes. More particularly, two of the chain-stopped methylpolysiloxanes described in Example 2, namely, Sample Nos. 5 and 6, were washed several times with water and to each was added either 0.5% or 1.0%, by weight, thereof benzoyl peroxide. Each sample was cast in a mold and heated for 72 hours at 150° C. to give gels which conformed exactly to the shape of the vessel in which they were baked. These gels did not exhibit any cracking, crazing or bubbling and appeared to have good cohesive strength. In an additional portion of washed Sample No. 6 (containing 0.5%, by weight, benzoyl peroxide) was placed an irregular metal object (nut and bolt), and the polymer cured at 150° C. as above to form a firm gel which again did not exhibit any cracking, crazing or bubbling, and which completely enveloped the metal object without forming voids.

EXAMPLE 5

This example illustrates the ability to make strongly adherent coating compositions from the polymers of Example 2, specifically, Sample Nos. 5 and 6. Pastes were prepared in each case by mixing 100 parts of each of these chain-stopped organopolysiloxanes with 100 parts titanium dioxide and 5 parts benzoyl peroxide. Each paste was spread on desized glass cloth and thereafter subjected to successive cures of 10 minutes at 100° C., 10 minutes at 150° C., 10 minutes at 250° C., and finally for 24 hours at 250° C. These glass cloth treated samples exhibited good gloss, good adhesion between the cured organopolysiloxane and the glass cloth, and good heat sealing properties. Samples of each of the above pastes were spread on glass plates to a thickness of about 13 mils and cured for 24 hours at 250° C., after which each sample was stripped from the plate and the tensile strength, elongation and percent weight loss after 24 hours at 250° C. were determined. With regard to the cured product based on Sample No. 6, it showed a tensile strength of 427 p.s.i., an elongation of 125%, and a weight loss of 13.4%. The film made from Sample No. 5 showed a tensile strength of 393 p.s.i., an elongation of 125%, and a weight loss of 11.4%. These physical properties are believed to be quite good in view of the fact that no pressure was applied in the molding of these samples.

EXAMPLE 6

Organopolysiloxanes similar to those described in Example 2 may be prepared employing in place of the tetraphenyldivinyldisiloxane, other alkenyl disiloxanes, such as tetraorganodiallyldisiloxanes or alkenyl organosilanols embraced within the formulations previously described. Thus, one may effect reaction in the same way as described in Example 2 between octamethylcyclotetrasiloxane and 1,1,3,3-tetraphenyl-1,3-diallyldisiloxane or 1,1,3,3-tetramethyl-1,3-diallyldisiloxane to give, respectively,

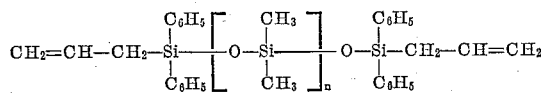

and

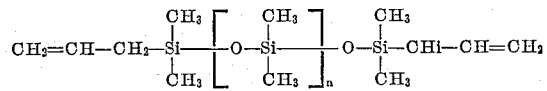

where $n$ is an integer greater than 1, depending upon the molar concentrations of the alkenyl disiloxanes. These allyl chain-stopped methylpolysiloxanes may be compounded with various fillers and curing agents, as is more particularly described in Example 2 to give cured, solid, elastic products having comparable heat resistance at elevated temperatures and physical properties, including improved compression set characteristics.

EXAMPLE 7

Instead of using the alkenyl disiloxanes of the preceding examples, one may also employ alkenyl organosilanols, many examples of which have been given previously. Thus, vinyl, phenyl chain-stopped methylpolysiloxanes similar to those described in Example 2 may be obtained by effecting reaction betwen octamethylcyclotetrasiloxane and vinyldiphenylsilanol taking into account the fact that for viscosities comparable to those recited in Example 2, at least twice the amount of the vinyldiphenylsilanol may be required in place of the tetraphenyldivinyldisiloxane employed in Example 2. In addition, using the conditions recited in Examples 2 and 6 above, one may also use other alkenyl organosilanols, for instance, one may interact allyldiethylsilanol with octamethylcyclotetrasiloxane or mixtures of octamethylcyclotetrasiloxane and hexaphenylcyclotrisiloxane (whereby the cyclic methylpolysiloxane comprises at least 50 mol percent of the total molar concentration of the cyclic organopolysiloxanes) to give compositions coming within the scope of the present invention. These compositions may be mixed with fillers and curing agent, thereafter heated at elevated temperatures to obtain cured, solid, elastic products having the desirable properties at elevated temperatures recited previously.

The foregoing examples describe the preparation of alkenyl chain-stopped organopolysiloxanes in which only one alkenyl group is present at each end of the linear chain. We have found that alkenyl chain-stopped organopolysiloxanes may also be prepared in which there are two alkenyl groups, for instance, allyl or vinyl groups at each end of the linear organopolysiloxane, whereby one can obtain organopolysiloxanes of the formula

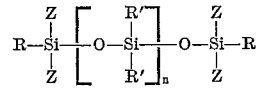

where Z, R, R' and $n$ have the meanings given above. If Z is an allyl group, R is an ethyl group and R' is a methyl group, the formed composition will have the general formula

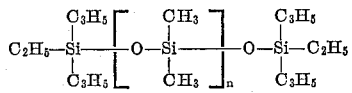

where $n$ has the above meaning.

EXAMPLE 8

Diallyl ethylchlorosilane was prepared as follows. Ethyl magnesium bromide was prepared in the usual fashion from 13.4 grams magnesium turnings and 60.6 grams ethyl bromide in diethyl ether. The resulting Grignard reagent was coupled in diethyl ether with 100 grams diallyldichlorosilane in the usual manner. The inorganic salts were filtered and the ether was removed by distillation. The residual liquid was fractionally distilled to yield 67 grams of diallyl ethyl chlorosilane (found: 18.9% chloride; calculated: 20.3%) boiling at about 75–85° C. at 25 mm. About 54.5 grams of the above prepared diallylethyl chlorosilane were mixed with 66.5 grams acetic anhydride. The formed acetyl chloride and excess acetic anhydride were removed by distillation and the residual liquid was fractionally distilled to yield 44 grams of diallylethylacetoxysilane boiling between 49–63° C. at 0.2 mm. That the latter compound was actually obtained was verified by the fact that analysis thereof showed it to contain 14.3% silicon as compared to the theoretical value of 14.1% silicon. About 34 grams of the above prepared diallylethylacetoxysilane were added dropwise with stirring to a mixture of 300 cc. of water and 50 cc. of diethyl ether. The ether layer was separated, washed several times with water, dried over anhydrous magnesium sulfate, filtered and the ether removed by distillation. The residual liquid was distilled under reduced pressure to yield 7.8 grams of diallylethylsilanol boiling at about 44–50° C. at 0.2 mm. The identity of this compound was verified by analysis which showed that the compound contained 61.0% carbon, 10.6% hydrogen, and 18.0% silicon (theoretical 61.5% carbon, 10.3% hydrogen, and 17.9% silicon).

EXAMPLE 9

Two different amounts of the diallylethylsilanol prepared in Example 8 were copolymerized with octamethylcyclotetrasiloxane as follows. In each case 296 grams of octamethylcyclotetrasiloxane were heated to about 135° C. after which 0.12 gram KOH was added and allowed to react at this temperature for about one-half hour. Thereafter, in one case 0.2 gram (0.068 percent) diallylethylsilanol was added and in another case 0.8 gram (0.27 percent) diallylethylsilanol was added and the mixture of ingredients heated at about 135° C. for another two hours. The polymers thus obtained were each fluid and corresponded qualitatively to the fluid polymers prepared using diphenylvinyl chain-stopping units from the alkenyl disiloxane as described in the previous examples. No evidence of cleavage or gel formation was noted. To 100 grams of each of the two copolymers prepared above were added 100 grams silica aerogel and 1.65 grams benzoyl peroxide. Each mixture of ingredients was thereafter molded at 150° C. for 15 minutes at about 750 p.s.i., and then heat-treated in an air oven at 250° C. for 24 hours, and finally at 250° C. for a total of 94 hours, testing each sample after each heat treatment and press cure for tensile strength and elongation. The following Table II shows the results of these tests in which the concentration of diallylethylsilanol designates the polymer employed.

Table II

| Weight percent of diallylethylsilanol in Polymer | Cure conditions | Percent elongation | Tensile, p.s.i. |
|---|---|---|---|
| 0.068 | Press cured | 465 | 880 |
| 0.068 | Press cured+24 hrs. at 250° C | 175 | 535 |
| 0.068 | Press cured+94 hrs. at 250° C | 185 | 640 |
| 0.27 | Press cured | 375 | 620 |
| 0.27 | Press cured+24 hrs. at 250° C | 150 | 515 |
| 0.27 | Press cured+94 hrs. at 250° C | 135 | 585 |

It will, of course, be apparent to those skilled in the art that in addition to the alkenyl disiloxanes and alkenyl silanols recited in the above examples, other alkenyl disiloxanes and alkenyl silanols such as those, for instance, having the formula

where Z and R have meanings given above, may be used without departing from the scope of the invention. When employing the disiloxanes, one may employ a vinyl disiloxane of the formula

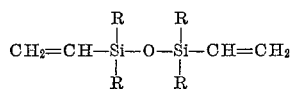

or an allyl disiloxane of the formula

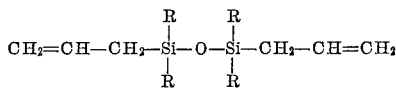

where R has the meaning given above. Where one employs disiloxanes of the formula

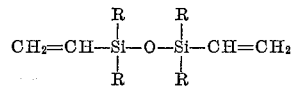

for condensation or polymerization with organopolysiloxane consisting essentially of the recurring structural unit

where R and R' have the meaning given above, one will obtain chain-stopped linear polysiloxanes having the general formula

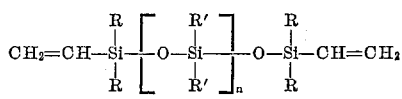

where R and R' again have the meanings designated above and $n$ is an integer equal to at least 1, for instance, from about 10 to 10,000 or more. Where one intercondenses cyclic methylpolysiloxanes with the alkenyl disiloxane, the linear chain-stopped polymer will correspond to the formula

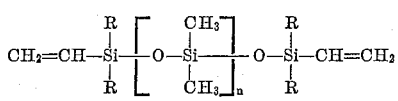

where R is a member selected from the class consisting of methyl, ethyl, phenyl, and chlorophenyl radicals, and $n$ has the significance given above. Obviously, in place of the vinyl group described in the above formula, one may substitute the allyl or methallyl group depending on the starting disiloxane or alkenyl diorganosilanol employed as a starting material.

Obviously, other fillers and curing agents, many examples of which have been given above, may be used without departing from the scope of the invention. As will also be apparent to persons skilled in the art, the viscosity or molecular weight of the chain-stopped organopolysiloxanes herein described may be varied widely by judicious choice of either the alkenyl disiloxane or the alkenyl organosilanol of the classes recited above.

The synthetic silicone elastomers prepared and described herein are able to withstand higher temperatures for longer periods of time than is possible by other synthetic rubbers, for instance, those of the hydrocarbon type. The desirable rubbery properties of the compositions herein disclosed are also available at temperatures as low as —50° C. to —60° C. Because of such a range of properties, the products described in the present invention are useful as insulation materials for electrical conductors, as gasket materials which may be subjected to extremely high temperatures, as shock absorbers, and for other applications in which other known natural or synthetic rubbers have heretofore been unacceptable for use at elevated temperatures. In connection with the use of these compositions as gasket materials, the fact that the compression set characteristics are improved without necessity of using preformed compression set additives renders these materials eminently suitable for applications involving intimate contact with foods or drugs and where it is desired to avoid the use of toxic or hazardous compression set additives. Finally, the versatility of preparing these compositions whereby rigid control can be maintained over the type of product obtained while at the same time avoiding the necessity of observing the necessary precautions heretofore found essential in the manufacture of convertible organopolysiloxanes, constitutes still further advantages of our compositions and methods for preparing the same.

Because of the presence of terminal alkenyl radicals on the compositions described and claimed in the present application, it is possible to inter-polymerize these materials with other copolymerizable compositions containing terminal polymerizable $CH_2=C<$ radicals, such as styrene, vinyl acetate, acrylonitrile, etc., employing the usual polymerizing agents, many examples of which have been given above, such as benzoyl peroxide. By means of these aforementioned monomeric copolymerizable ingredients, it is possible to modify the properties of the alkenyl polysiloxanes described herein. A further advantage residing in the alkenyl chain-stopped polysiloxanes is the ability to covulcanize these fluid polymers with other elastomers usually of the hydrocarbon type, such as natural rubber, butyl rubber, copolymeric elastomers of butadiene and styrene, chloroprene, etc., to produce modified rubbers of improved properties. In the latter instance, advantage can be taken of the unsaturation in both the alkenyl polysiloxane and the copolymerizable elastomer to use vulcanizing agents and vulcanization accelerators usually employed with the latter rubbers as, for instance, sulfur, various dithiocarbamates, etc.

The concurrent use of the alkenyl chain-stopped polysiloxanes, for instance, vinyl chain-stopped methylpolysiloxanes, containing finely divided silica fillers, especially finely divided precipitated silica fillers (such as the previously described Hi-Sil), in combination with dichlorobenzoyl peroxide as a curing agent, results in cured products having attractive low compression set characteristics even without the incorporation of a compression set additive. In addition, the concurrent presence of these ingredients, namely, alkenyl chain-stopped polysiloxane, finely divided silica, and dichlorobenzoyl peroxide, permits curing the compound at lower temperatures, and more rapidly at elevated temperatures with less danger of porosity than is possible by the use under similar circumstances, of benzoyl peroxide.

The advantage of using the dichlorobenzoyl peroxide, specifically, 2,4-dichlorobenzoyl peroxide discussed above, is shown by the following in which 100 parts of a vinyl chain-stopped organopolysiloxane (prepared by heating a mixture of ingredients comprising, by weight, 600 parts octamethylcyclotetrasiloxane, 0.06 part KOH and 0.6 part 1,1,3,3-tetraphenyl-1,3-divinylsiloxane in the manner described in Example 2) were mixed with 50 parts of a finely divided silica, specifically the previously mentioned Hi-Sil, and 5 parts of a paste of which 40% was 2,4-dichlorobenzoyl peroxide and 60% was a methyl silicone oil used as a dispersant. As a control, a similar formulation was prepared with the exception that 3 parts of a 50% benzoyl peroxide paste (the remainder being methyl silicone oil dispersant) was substituted for the 2,4-dichlorobenzoyl peroxide paste. Each mixture of ingredients was allowed to stand or age at room temperature for about 24 hours and thereafter molded into the form of cylindrical plugs ⅜″ high ¾″ and in diameter. The plugs were placed directly in an oven at a temperature of about 250° C. for periods of from 60 seconds to 120 seconds. The plug containing the 2,4-dichlorobenzoyl peroxide remained solid and showed no evidence of porosity due to blowing during all the time it remained in the oven at the aforementioned temperature. In contrast to this, the control sample containing benzoyl peroxide as the curing agent showed slight evidence of porosity or blowing after 60 seconds and after 120 seconds showed considerable porosity throughout the plug.

What we claim as new and desire to secure by Letters Patent of the United States is:

1. Organopolysiloxanes having the general formula

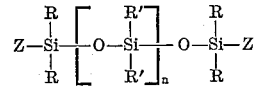

where Z is a vinyl radical, R is a member selected from the class consisting of methyl, ethyl, phenyl and chlorinated phenyl radicals, R′ is a monovalent hydrocarbon radical, and $n$ represents a positive integer of from 50 to 10,000, the aforesaid organopolysiloxanes having been obtained by effecting interpolymerization between (1) a compound corresponding to the general formula

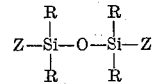

and (2) a compound corresponding to the general formula $[R'_2SiO]_m$, where Z, R and R′ have the meanings given above, and $m$ is an integer equal to from 3 to 10, inclusive.

2. Organopolysiloxanes having the general formula

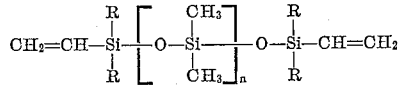

where R is a member selected from the class consisting of methyl, ethyl, phenyl and chlorophenyl radicals, and $n$ is an integer of from 50 to 1,000, the aforesaid organopolysiloxanes having been obtained by interpolymerizing a compound of the formula

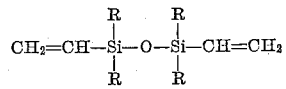

with a compound having the formula $[(CH_3)_2SiO]_m$ where R has the meaning given above and $m$ is an integer equal to from 3 to 10.

3. A composition of matter having the formula

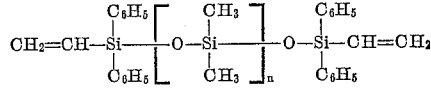

where $n$ is an integer of from 50 to 10,000, the above composition of matter having been obtained by interpolymerizing divinyl tetraphenyl disiloxane and octamethylcyclotetrasiloxane.

4. A composition of matter having the formula

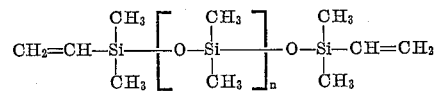

where $n$ is an integer of from 50 to 10,000, the said composition of matter having been obtained by interpolymerizing divinyl tetramethyl disiloxane and octamethylcyclotetrasiloxane.

5. A composition of matter comprising (1) a mixture of organopolysiloxanes having the general formula

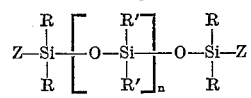

where Z is a vinyl radical, R is a member selected from the class consisting of methyl, ethyl, phenyl and chlorinated phenyl radicals, R′ is a monovalent hydrocarbon radical, and $n$ is an integer of from 50 to 10,000, the said organopolysiloxanes having been obtained by interpolymerizing a disiloxane having the general formula

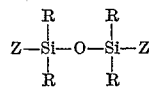

and a cyclic organopolysiloxane having the general formula $[R'_2SiO]_m$, where Z, R and R′ have the meanings given above and $m$ is an integer equal to from 3 to 10, inclusive, and (2) a finely divided filler.

6. A composition of matter comprising (a) an organopolysiloxane having the general formula

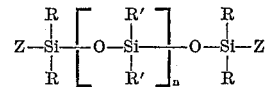

where Z is a vinyl radical, R is a member selected from the class consisting of methyl, ethyl, phenyl and chlorinated phenyl radicals, R' is a monovalent hydrocarbon radical, and $n$ is an integer of from 50 to 10,000, the said organopolysiloxane having been obtained by interpolymerizing a compound having the general formula

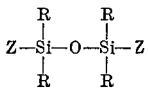

with a composition having the general formula $[R'_2SiO]_m$, where Z, R and R' have the meanings given above, and $m$ is an integer equal to from 3 to 10, inclusive, (b) a finely divided filler and (c) a curing agent for (a).

7. A composition of matter comprising (a) an organopolysiloxane having the formula

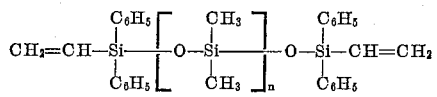

where $n$ is an integer of from 50 to 10,000, the said organopolysiloxane having been obtained by interpolymerizing divinyltetraphenyldisiloxane with octamethylcyclotetrasiloxane, (b) a finely divided silica filler and (c) a curing agent for (a) comprising benzoyl peroxide.

8. The heat-treated product of claim 6.

9. The heat-treated product of claim 7.

10. The process for preparing organopolysiloxanes having the general formula

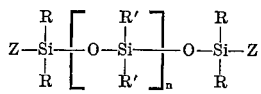

which process comprises reacting a mixture of ingredients comprising (1) a compound having the general formula

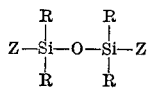

and (2) an organopolysiloxane having the formula $[R'_2SiO]_m$ where Z is a vinyl radical, R is a member selected from the class consisting of methyl, ethyl, phenyl and chlorinated phenyl radicals, R' is a monovalent hydrocarbon radical, where $m$ is an integer equal to from 3 to 10, and $n$ is an integer of from 50 to 10,000.

11. The process for preparing compounds of the formula

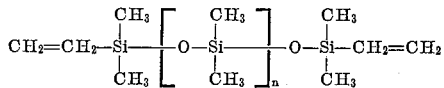

where $n$ is an integer of from 50 to 10,000, which process comprises interpolymerizing a mixture of ingredients comprising (1) 1,1,3,3-tetramethyl-1,3-divinyldisiloxane with (2) octamethylcyclotetrasiloxane.

12. The process which comprises (1) effecting reaction between (a) from 0.2 to 7.2 parts, by weight, of 1,1,3,3-tetraphenyl-1,3-divinyldisiloxane and (b) 296 parts by weight, octamethylcyclotetrasiloxane, (2) incorporating a finely divided silica filler in the reaction product of (1) together with a small amount of benzoyl peroxide as a curing agent, and (3) thereafter heating the latter mixture of ingredients for a time and at a temperature sufficient to effect curing of the mixture of ingredients to the cured, solid, elastic state.

13. 1,1,3,3-tetraphenyl-1,3-divinyldisiloxane.

14. A composition of matter comprising (a) an organopolysiloxane having the general formula

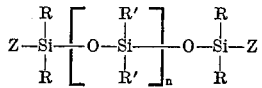

where Z is a vinyl radical, R is a member selected from the class consisting of methyl, ethyl, phenyl and chlorinated phenyl radicals, R' is a monovalent hydrocarbon radical, and $n$ is an integer of from 50 to 10,000, the aforesaid organopolysiloxane having been obtained by interpolymerizing a mixture of ingredients comprising (1) a compound having the formula

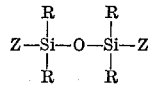

and (2) a compound having the general formula $[R'_2SiO]_m$, where Z, R and R' have the meanings given above and $m$ is an integer equal to from 3 to 10, (b) a finely divided silica filler and (c) a curing agent for (a) comprising dichlorobenzoyl peroxide.

15. A composition exhibiting low compression set characteristics composed of the heat treated-product of claim 14.

16. A composition of matter comprising (a) an organopolysiloxane having the formula

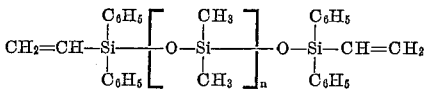

where $n$ is an integer of from 50 to 10,000, the aforesaid organopolysiloxane having been obtained by interpolymerizing divinyl tetraphenyl disiloxane with octamethylcyclotetrasiloxane, (b) a finely divided silica filler and (c) a curing agent for (a) comprising dichlorobenzoyl peroxide.

17. A composition having low compression set characteristics comprising the heat-treated product of claim 16.

18. An organopolysiloxane having the general formula

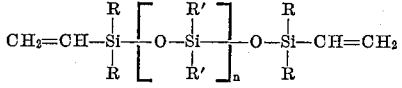

where R is an alkyl radical of up to two carbon atoms, R' is a monovalent hydrocarbon radical of less than 8 carbon atoms, $n$ represents a number of at least about 250, and from .1-3 parts by weight of an organic peroxide vulcanizing agent per 100 parts by weight of polysiloxane.

19. An organopolysiloxane having the general formula

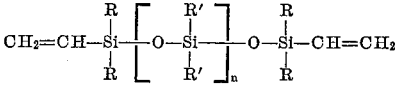

where R is a phenyl radical, R' is a monovalent hydrocarbon radical of less than 8 carbon atoms, $n$ represents a number of at least about 250, and from .1-3 parts by weight of an organic peroxide vulcanizing agent per 100 parts by weight of polysiloxane.

References Cited in the file of this patent

UNITED STATES PATENTS

| | | |
|---|---|---|
| 2,486,162 | Hyde | Oct. 25, 1949 |
| 2,595,729 | Swiss et al. | May 6, 1952 |
| 2,595,730 | Swiss et al. | May 6, 1952 |
| 2,716,638 | Cohen et al. | Aug. 30, 1955 |
| 2,737,506 | Hurd et al. | Mar. 6, 1956 |
| 2,756,246 | Burkhard | July 24, 1956 |

FOREIGN PATENTS

| | | |
|---|---|---|
| 620,692 | Great Britain | Mar. 29, 1949 |

OTHER REFERENCES

Hurd: J. Amer. Chem. Soc., October 1945, vol. 67, pp. 1813 and 1814.

Scott et al.: J Amer. Chem. Soc, June 1951, vol. 73, pp. 2599 and 2600.